United States Patent
Jung et al.

(10) Patent No.: US 9,635,130 B2
(45) Date of Patent: Apr. 25, 2017

(54) METHOD AND APPARATUS FOR SETTING COMMUNICATION AND RECORDING MEDIUM THEREOF

(71) Applicant: SAMSUNG ELECTRONICS CO., LTD., Suwon-si (KR)

(72) Inventors: Ji-youn Jung, Suwon-si (KR); Bae-eun Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 14/484,994

(22) Filed: Sep. 12, 2014

(65) Prior Publication Data

US 2015/0074182 A1  Mar. 12, 2015

(30) Foreign Application Priority Data

Sep. 12, 2013 (KR) .................. 10-2013-0109978

(51) Int. Cl.
 *G06F 15/16* (2006.01)
 *H04L 29/08* (2006.01)

(52) U.S. Cl.
 CPC .......... *H04L 67/306* (2013.01); *H04L 67/141* (2013.01)

(58) Field of Classification Search
 CPC ..................... H04L 67/141; H04L 67/306
 USPC ....................................... 709/203
 See application file for complete search history.

(56) References Cited

U.S. PATENT DOCUMENTS

| 7,693,534 | B1* | 4/2010 | Lundy | H04L 12/1818 |
| | | | | 455/459 |
| 7,987,233 | B1* | 7/2011 | Osborne | H04N 7/15 |
| | | | | 709/206 |
| 8,571,194 | B2* | 10/2013 | Turner | H04L 12/1818 |
| | | | | 370/261 |

(Continued)

FOREIGN PATENT DOCUMENTS

WO  2013/036092 A2  3/2013

OTHER PUBLICATIONS

Author: Istemi Ekin Akkus, Oznur Ozkasap, M. Reha Civanlar Title: Peer-to peer multipoint video conferencing with layered video Date: 2010 Publisher: Journal of Network and Computer Applications 34 (2011) 137-150.*

(Continued)

*Primary Examiner* — John Macilwinen
(74) *Attorney, Agent, or Firm* — Sughrue Mion, PLLC

(57) ABSTRACT

Methods and apparatuses for setting communication with devices included in a group are provided. The method includes receiving, from a host device included in the group, a communication initiation request for setting communication between the host device and the first client device, determining whether to set communication with the host device based on a communication state of the first client device, receiving, from a second client device, a communication extension request for setting communication between the second client device and the first client device, determining whether the second client device is included in the group, and in response to the second client device being included in the group, determining whether to set communication with the second client device based on whether communication with the host device and the first client device is set.

19 Claims, 10 Drawing Sheets

(56) References Cited

U.S. PATENT DOCUMENTS

| | | | |
|---|---|---|---|
| 2005/0101287 A1* | 5/2005 | Jin | H04M 1/677 455/404.1 |
| 2005/0256925 A1 | 11/2005 | Luo et al. | |
| 2008/0003999 A1* | 1/2008 | Sung | H04W 28/18 455/422.1 |
| 2009/0316686 A1* | 12/2009 | Mandre | H04L 12/1818 370/352 |
| 2011/0034127 A1 | 2/2011 | Wentink et al. | |
| 2011/0122835 A1 | 5/2011 | Naito et al. | |
| 2011/0158231 A1* | 6/2011 | Kudo | H04L 12/1818 370/389 |
| 2011/0282989 A1 | 11/2011 | Geirhofer et al. | |
| 2012/0134349 A1 | 5/2012 | Jung et al. | |
| 2012/0243673 A1* | 9/2012 | Carr | H04L 12/1818 379/202.01 |
| 2014/0226639 A1 | 8/2014 | Yi et al. | |

OTHER PUBLICATIONS

Simons, Sjoerd, et al., "XEP-0272: Multiparty Jingle (Muji)", XMPP Standards Foundation, Sep. 11, 2009, 7 pages.
International Search Report (PCT/ISA/210) dated Dec. 4, 2014, issued in International Application No. PCT/KR2014/008532.
Written Opinion (PCT/ISA/237) dated Dec. 4, 2014, issued in International Application No. PCT/KR2014/008532.

* cited by examiner

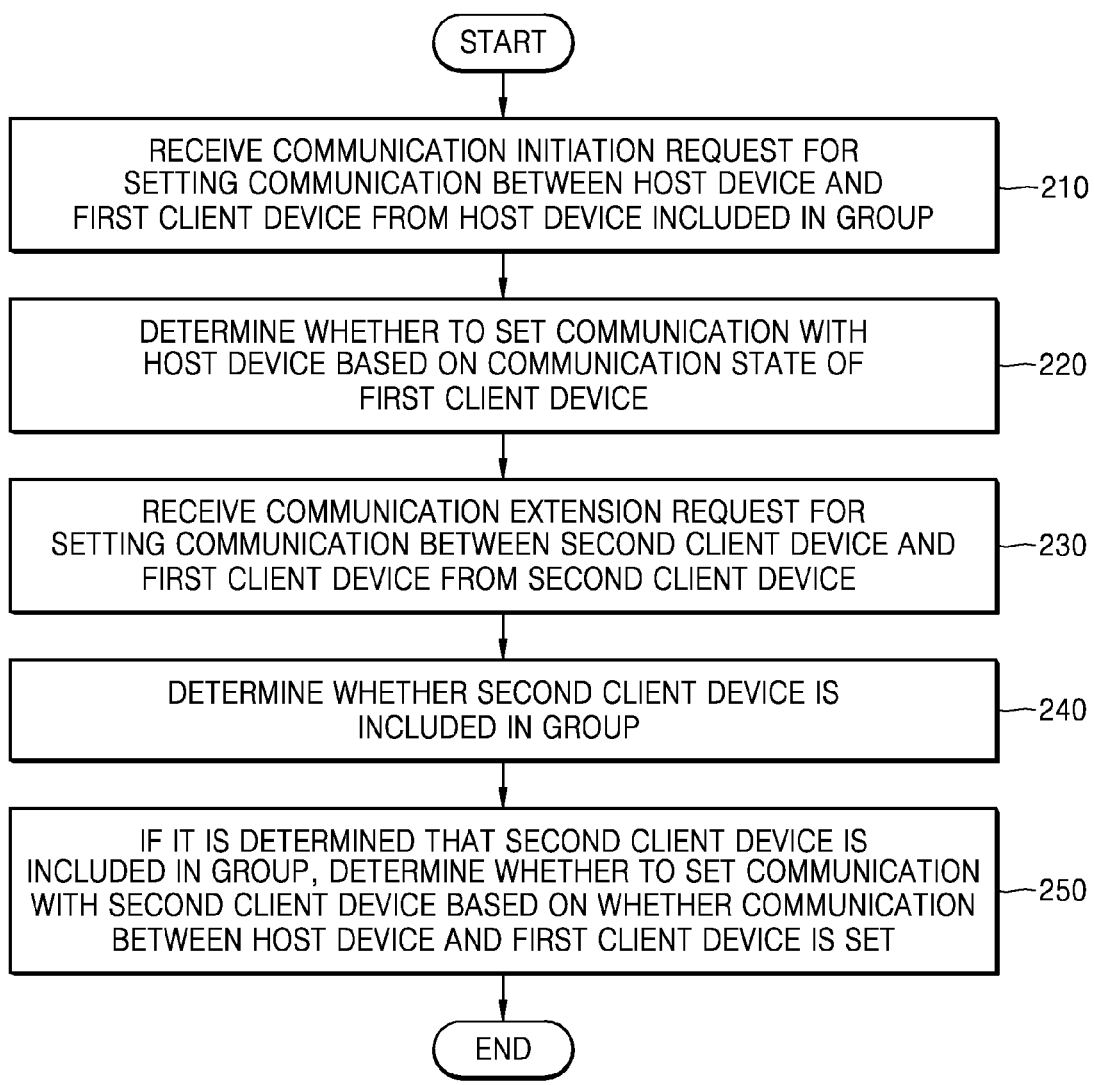

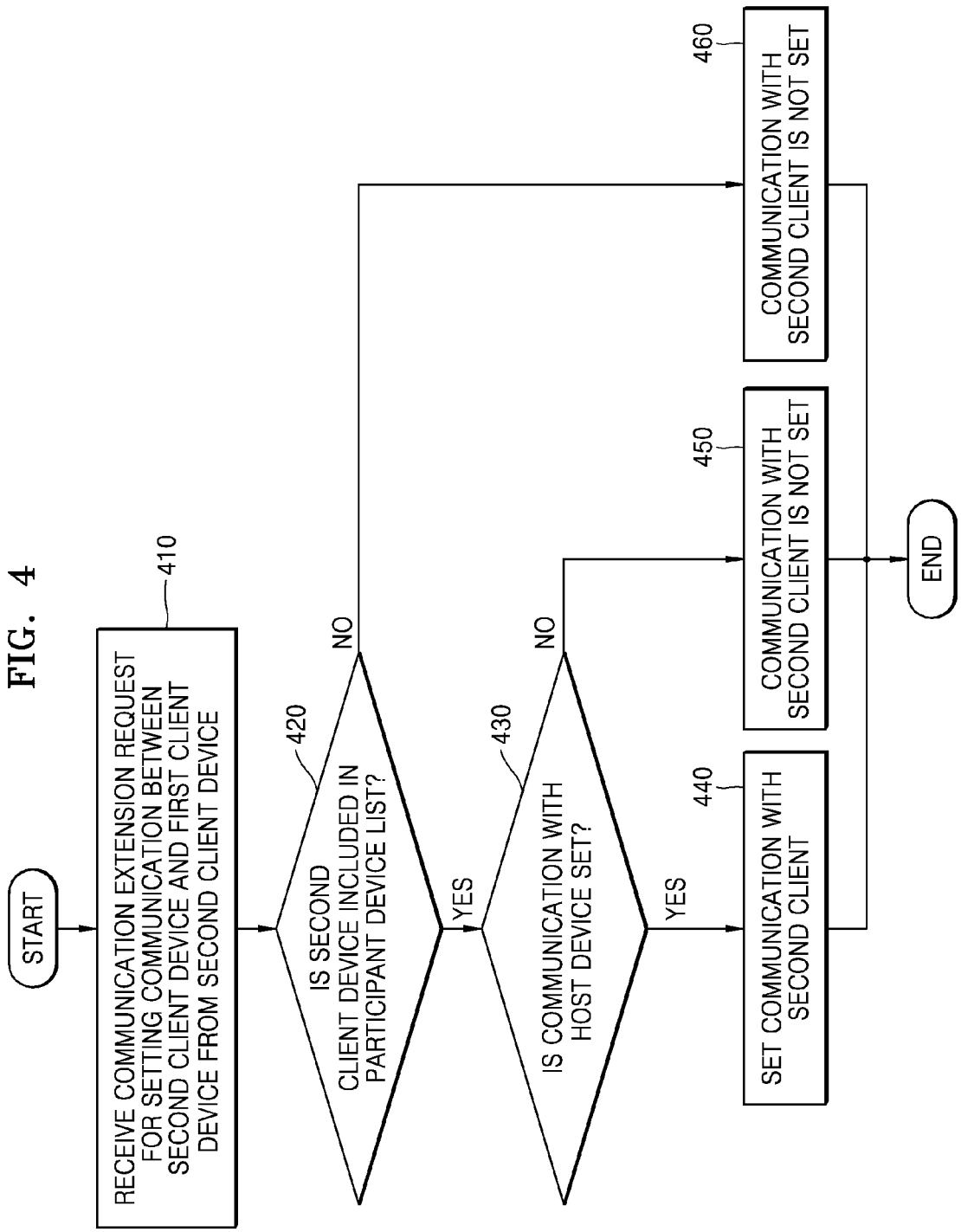

METHOD AND APPARATUS FOR SETTING COMMUNICATION AND RECORDING MEDIUM THEREOF

CROSS-REFERENCE TO RELATED APPLICATION(S)

This application claims priority from Korean Patent Application No. 10-2013-0109978, filed on Sep. 12, 2013, in the Korean Intellectual Property Office, the disclosure of which is incorporated herein in its entirety by reference.

BACKGROUND

1. Field

Apparatuses and methods consistent with exemplary embodiments relate to a method and apparatus for setting communication between a plurality of devices, and more particularly, to a method and apparatus for setting communication between a plurality of terminals using a full mesh method, and a recording medium for the method.

2. Description of Related Art

Due to the high performance of networks and devices, the methods of communication are rapidly changing. Accordingly, devices like smartphones are able to provide not only a unique voice communication service but also other various services. One representative example of a communication service is a multipoint communication service.

Examples of multipoint communication include a server micro controller unit (MCU) method in which a server receives and mixes media and transmits the mixed media to a participant device. Another example is a full mesh method in which all devices participating in communication connect to a media session with all other participant devices and media is transmitted or received between each channel of each device.

A full mesh topology occurs when every node in the network has a circuit connecting it to every other node in the network. Full mesh is expensive to implement but yields the greatest amount of redundancy, so in the even that one of those nodes fails, network traffic can be directed to any of the other nodes.

Because it is difficult for a device to process multiple pieces of media independently due to limitations in the performance of the device, a server MCU method is used more often than a full mesh method in the related art.

SUMMARY

One or more exemplary embodiments include a method and apparatus for setting communication between a plurality of devices using a full mesh method, and a recording medium therefor.

Additional aspects are set forth in part in the description which follows and, in part, will be apparent from the description, or may be learned by practice of the presented exemplary embodiments.

According to an aspect of an exemplary embodiment, there is provided a method of a first client device for setting communication with devices included in a group, the method including receiving, from a host device included in the group, a communication initiation request for setting communication between the host device and the first client device, determining whether to set communication with the host device based on a communication state of the first client device, receiving, from a second client device, a communication extension request for setting a communication between the second client device and the first client device, determining whether the second client device is included in the group, and in response to determining that the second client device is included in the group, determining whether to set the communication with the second client device based on whether communication with the host device and the first client device is set.

According to an aspect of another exemplary embodiment, there is provided a method of a host device for setting communication with devices included in a group, the method including selecting a plurality of client devices included in the group according to a selection by a user, transmitting a communication initiation request for setting communication to the plurality of client devices included in the group, and determining whether to set communication with the plurality of client devices based on responses of the plurality of client devices to the transmitted communication initiation request.

According to an aspect of another exemplary embodiment, there is provided a first client device that sets communication with other devices included in a group, the first client device including a transceiver that receives, from the host device included in the group, a communication initiation request for setting communication between a host device and the first client device, and a controller that determines whether to set communication with the host device based on a communication state of the first client device, and determine whether to set communication with a second client device based on whether the second client device is included in the group and communication between the host device and the first client device is set.

According to an aspect of another exemplary embodiment, there is provided a host device that sets communication with devices included in a group, the host device including an input unit configured to receive a user selection of a plurality of client devices included in the group, an output unit configured to transmit a communication initiation request for setting communication, to the plurality of client devices included in the group, and a controller configured to determine whether to set communication with the plurality of client devices based on responses of the plurality of client devices.

BRIEF DESCRIPTION OF THE DRAWINGS

These and/or other aspects will become apparent and more readily appreciated from the following description of the exemplary embodiments, taken in conjunction with the accompanying drawings in which:

FIG. 2 is a flowchart illustrating a method in which a first client device communicates with other devices included in a group to which the first client device belongs, according to an exemplary embodiment;

FIG. 4 is a flowchart illustrating a method of a first client device determining whether to set communication with a second client device, according to an exemplary embodiment;

DETAILED DESCRIPTION

Figure 1:
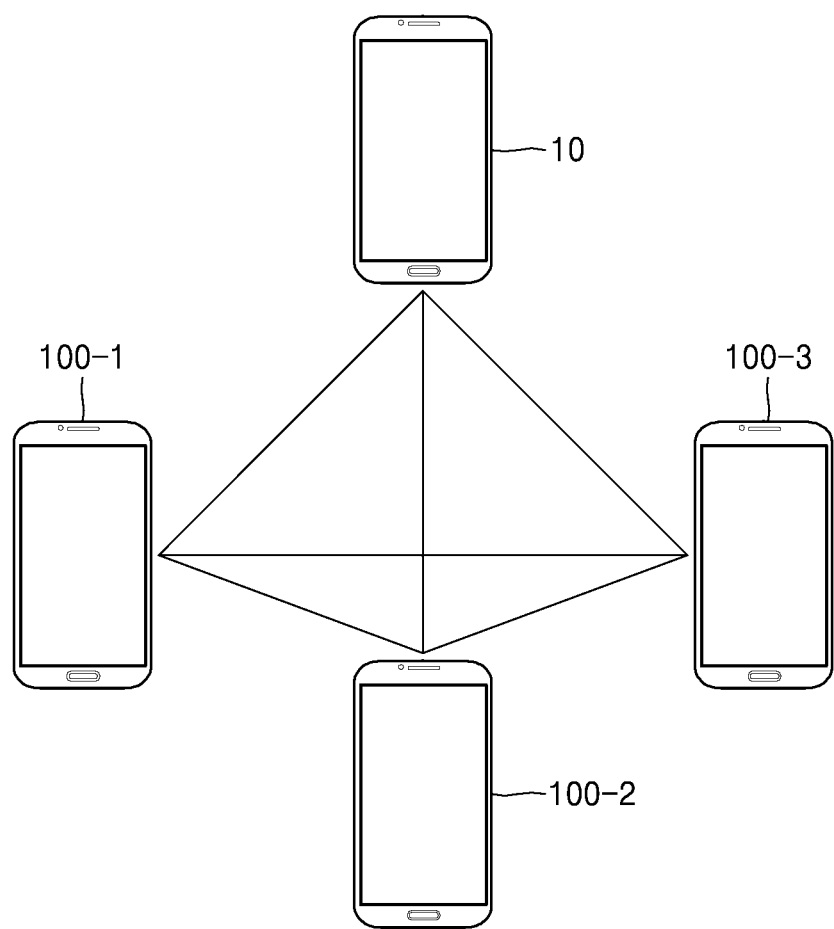
FIG. 1 is a diagram illustrating a communication that is set between a plurality of devices included in a predetermined group, according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the term "and/or" includes any and all combinations of one or more of the associated listed items. Expressions such as "at least one of," when preceding a list of elements, modify the entire list of elements and do not modify the individual elements of the list.

The attached drawings illustrating exemplary embodiments are referred to in order to gain a sufficient understanding of the present description, the merits thereof, and the objectives accomplished by the implementation of the present description. Hereinafter, the present description is described by explaining exemplary embodiments with reference to the attached drawings.

In the present specification, when an element "connects" or is "connected" to another element, the element may contact or may be connected to the other element not only directly but also electrically through at least one of other elements interposed therebetween. Also, when a part may "include" a certain element, unless specified otherwise, it may be construed to further include other constituent elements.

FIG. 1 is a diagram illustrating a method in which communication is set between a plurality of devices included in a predetermined group, according to an exemplary embodiment.

Referring to FIG. 1, a host device 10, a first client device 100-1, a second client device 100-2, and a third client device 100-3 are included in the predetermined group.

The plurality of devices included in the predetermined group may each be capable of communicating according to a full mesh method. In the full mesh method, communication may be set between respective devices included in the predetermined group. Communication between some devices may not be set based on a communication state of the respective devices included in the predetermined group. For example, each of the plurality of devices may set communication with other devices included in the predetermined group, and may provide a user of each device with a phone conversation service such as a voice call service, a video call service, and the like. Also, the devices may transmit and receive various types of multimedia to or from one another based on the set communication.

The plurality of devices may output information about an event that is generated while communication is being set. For example, when a predetermined device receives a request from another device for setting communication, information about an event that is received from the request for setting communication may be provided to the predetermined device. For example, information about an event may be provided to a user of the device via a vibration, a sound, a message, and the like. As another example, a user interface through which a request for setting communication can be received may be provided to a user through a predetermined device screen.

For convenience of description, the first client device 100-1, the second client device 100-2, and the third client device 100-3, will be referred to as a first client 100-1, a second client 100-2, and a third client 100-3, respectively.

The host device 10 may set communication with each of the first client 100-1, the second client 100-2, and the third client 100-3 included in a predetermined group. For example, the host device 10 may generate a list including identification information of a plurality of devices with respect to which communication is to be set. Also, the host device 10 may transmit the list to each device included in the predetermined group. The host device 10 may provide a user with information about a response or a request received from another device included in the predetermined group. For example, if the host device 10 receives a response for accepting the setting of communication from the first client 100-1, a response indicating that communication with the first client device is set may be displayed on a screen of the host device 10 via a user interface.

The host device 10 may be implemented in various forms. For example, the host device 10 may be a mobile phone, a smartphone, a computer, a laptop computer, a tablet, a server, and the like, but is not limited thereto.

The first client 100-1 may set communication with each of the host device 10, the second client 100-2, and the third client 100-3 included in the predetermined group. For example, the first client 100-1 may check a list generated using the host device 10 to set communication with other client devices included in the predetermined group. The first client 100-1 may provide a user with information about a response or request received from another device that is also included in the predetermined group. For example, if the first client 100-1 receives a request for setting communication from the second client 100-2, the first client 100-1 may display information about the received request on a screen thereof.

The first client 100-1, the second client 100-2, and the third client 100-3 may be implemented in various forms. For example, the clients may be a mobile phone, a smartphone, a computer, a laptop computer, a tablet, a server, and the like, but is not limited thereto.

The second client 100-2 may set communication with each of the host device 10, the first client 100-1, and the third client 100-3 included in the predetermined group. For example, the second client 100-2 may perform the same function as the first client 100-1 described above. In addition, the third client 100-3 may set communication with each of the host device 10, the first client 100-1, and the second client 100-2 included in the predetermined group. Also, the third client 100-3 may perform the same function as the first client 100-1 described above.

Hereinafter, a method of setting communication using the host device 10, the first client 100-1, the second client 100-2, and the third client 100-3, which are included in a predetermined group, is described with reference to FIG. 2.

FIG. 2 is a flowchart illustrating a method in which the first client device 100-1 communicates with other devices included in a group (hereinafter referred to as group A) to which the first client 100-1 belongs, according to an exemplary embodiment.

Referring to FIG. 2, in operation 210, the first client 100-1 receives a communication initiation request for setting communication between the host device 10 and the first client 100-1, from the host device 10 included in group A. For example, the communication initiation request may be a signal that is transmitted by the host device 10 to a plurality of client devices such as the first client 100-1, the second client 100-2, and the third client 100-3 included in the group A. The plurality of client devices that belong to group A may be selected using the host device 10. A method of selecting the plurality of client devices using the host device 10 is described with reference to FIG. 5.

A participant device list including identification information of a plurality of devices that are apart of group A and identification information of group A may be included in a communication initiation request. If a device is a mobile device such as a smartphone, the identification information may include one or more of a serial number, a subscriber identity module (SIM) or universal SIM (USIM) chip number, a device user account, and the like. If a request or response related to setting communication is received from another device, the plurality of devices may determine whether the other device belongs to group A, based on the identification information of group A. Examples of information included in the communication initiation request are described with reference to FIG. 3.

For example, the first client 100-1 may receive a communication extension request from the second client 100-2 based on the participant device list. In this example, the second client 100-2 may have a higher priority than the first client 100-1 in a participant device list. For example, identification of devices may be displayed in the order of the host device 10, the second client 100-2, the first client 100-1, and the third client 100-3. Accordingly, the second client 100-2 is ordered before the first client 100-1.

In operation 220, the first client 100-1 determines whether to set communication with the host device 10 based on a communication state of the first client 100-1. For example, when the first client 100-1 has received a communication initiation request from the host device 10, and the first client 100-1 is already participating in a different communication network, communication with the host device 10 may not be set.

As another example, the first client 100-1 may determine whether to set communication with the host device 10 according to a user's selection. For example, the first client 100-1 may display information about a communication initiation request received from the host device 10, on a screen of the first client 100-1. Accordingly, the user may select whether to set communication with the host device 10 based on the information about a communication initiation request provided by the first client 100-1 on the screen.

Information about a communication initiation request may include a list of devices included in group A and information indicating that communication to be set is group communication. For example, a device identification may be stored in an address book of a user, and based on identification information of the respective devices included in group A, the first client 100-1 may display a name stored in the address book. In addition, the information indicating group communication may be provided to a user by a pop up of a preset label such as group call, on a screen.

When the first client 100-1 accepts communication with the host device 10, the first client 100-1 may transmit a communication acceptance message to the host device 10. On the other hand, when the first client 100-1 determines not to set communication with the host device 10, the first client 100-1 may transmit a communication rejection message to the host device 10.

In operation 230, the first client 100-1 receives a communication extension request for setting communication between the second client 100-2 and the first client 100-1, from the second client 100-2. For example, to set communication with each of a plurality of devices included in group A, the respective devices may transmit a request for setting communication based on an order in which the devices are recorded to a participant device list. The first client 100-1 may receive a communication extension request from the second client 100-2 which is ordered before the first client 100-1 in the participant device list.

A communication initiation request and a communication extension request may be included in a request for setting communication. A communication initiation request may be transmitted using the host device 10 to initiate communication with each of a plurality of client devices that belong to group A. Meanwhile, a communication extension request may be transmitted based on an order that is recorded in a participant device list to set communication between the client devices belonging to group A.

In operation 240, the first client 100-1 determines whether the second client 100-2 belongs to group A. For example, if identification information of the second client 100-2 is recorded to a participant device list included in a communication initiation request, the first client 100-1 may determine that the second client 100-2 is included in group A. As another example, if group identification information of the second client 100-2 included in a communication initiation request is the same as the group identification information of the first client 100-1, the first client 100-1 may determine that the second client 100-2 is included in group A.

In operation 250, in response to determining that the second client 100-2 is included in group A, the first client 100-1 determines whether to set communication with the second client 100-2 based on whether communication between the host device 10 and the first client 100-1 is set. For example, the first client 100-1 may respond to a communication extension request of the second client 100-2 based on the determination on whether to set communication with the second client 100-2.

According to various aspects, if the first client 100-1 has set communication with the host device 10, a communication acceptance message for setting communication with the second client 100-2 may be transmitted in regard to a communication extension request of the second client 100-2. The communication acceptance message may be automatically transmitted to the second client 100-2 if the first client 100-1 has set communication with the host device 10. When accepting a communication initiation request, the first client 100-1 may determine that setting communication with a plurality of devices included in group A is acceptable, and may automatically transmit a communication acceptance message in response to a communication extension request of the second client 100-2 without an additional determination process. As another example, if the first client 100-1 has rejected or ignored a communication initiation request of the host device 10, the first client 100-1 may automatically transmit a communication rejection message in response to a communication extension request of the second client 100-2.

According to various aspects, the first client 100-1 may automatically determine whether to set communication with other client devices included in group A based on whether communication with the host device 10 included in group A is set. Accordingly, a user of the first client 100-1 in group A may reduce a difficulty in determining whether to set communication with other client devices included in group A. For example, because the client devices in group A are already authenticated or otherwise trusted by the hosted device, the first client 100-1 may not need to perform an authentication or other verification to determine whether it is safe to transmit and receive data from the client devices in group A.

Figure 3A:
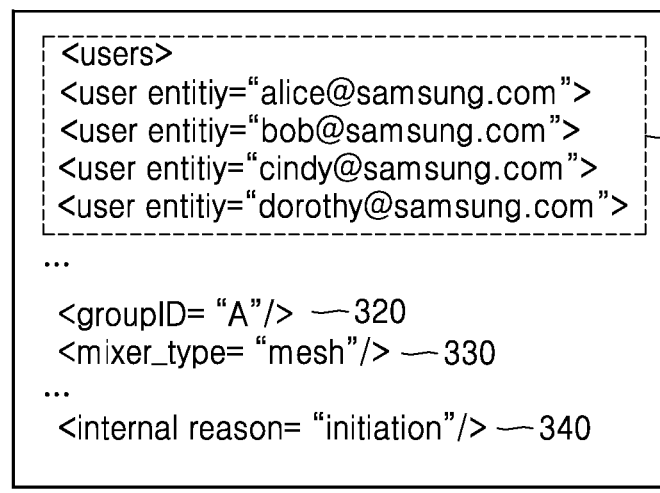
FIGS. 3A and 3B are diagrams illustrating information included in a communication initiation request and a communication extension request, according to an exemplary embodiment.
Figure 3B:
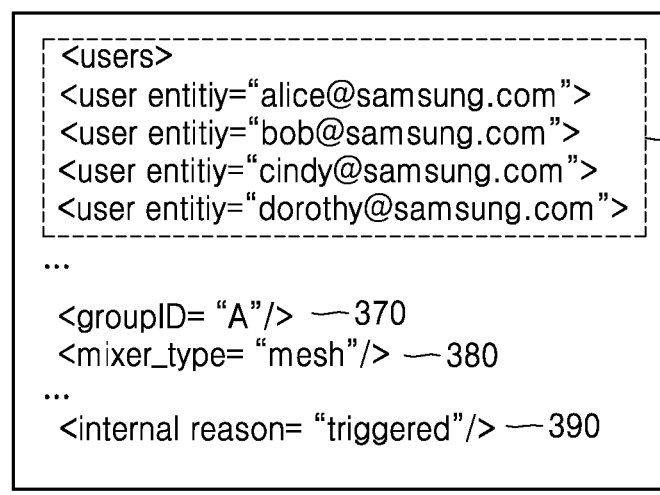

FIGS. 3A and 3B are diagrams illustrating information included in a communication initiation request and a communication extension request, according to an exemplary embodiment.

Referring to FIG. 3A, information 300 included in a communication initiation request is illustrated. The information 300 in a communication initiation request may include a participant device list 310 including identification information of a plurality of devices included in group A, identification information 320 of group A, call type information 330, and communication type information 340. However, it should be appreciated that the information 300 included in the communication initiation request is not limited thereto.

The participant device list 310 may include user account information of each of the host device 10, the first client 100-1, the second client 100-2, and the third client 100-3. For example, the user account information may include an email address, and the like. Referring to the participant device list 310, identification information of the host device 10 may be in the first place of the participant device list 310. Also, the first client 100-1 may transmit a communication extension request to the second client 100-2 and the third client 100-3 according to an order in which the second client 100-2 and the third client 100-3 are listed in the participant device list 310. Likewise, the second client 100-2 may transmit a communication extension request to the third client 100-3. The third client 100-3 is in the last place of the participant device list 310, and thus, the third client 100-3 may not transmit a communication extension request to other client devices.

The identification information 320 of group A may include the name 'A' of group A, and the call type information 330 may include information about a full mesh method in which communication is set with respect to the plurality of devices in group A. Also, in order to identify a call request type is a communication initiation request received from the host device 10, the term "initiation" may be labeled on the communication type information 340.

Referring to FIG. 3B, information 350 included in a communication extension request is illustrated. The information 350 included in a communication extension request may include a participant device list 360 that has identification information of a plurality of devices included group A, identification information 370 of group A, call type information 380, and call request type information 390. However, it should be appreciated that the information 350 included in a communication extension request is not limited thereto.

The participant device list 360 may include user account information of each of the host device 10, the first client 100-1, the second client 100-2, and the third client 100-3. The identification information 370 of group A may include the name 'A' of group A, and the call type information 380 may include information about a full mesh method in which communication is set with respect to each of a plurality of devices in group A. In this example, to identify a call request type is a communication extension request received from the host device 10, the term "triggered" may be labeled on the call request type information 390.

FIG. 4 is a flowchart illustrating a method of the first client 100-1 determining whether to set communication with the second client 100-2, according to an exemplary embodiment.

Referring to FIG. 4, in operation 410, the first client 100-1 receives a communication extension request for setting communication between the second client 100-2 and the first client 100-1, from the second client 100-2. In this example, operation 410 is similar to operation 230 of FIG. 2.

In operation 420, the first client 100-1 determines whether identification information of the second client device is included in a participant device list. For example, if identification information of the second client 100-2 is recorded in the participant device list included in a communication initiation request, the first client 100-1 may determine that the second client 100-2 is included in group A. As another example, if group identification information included in a communication initiation request is the same as group identification information of the first client 100-1, the first client 100-1 may determine that the second client 100-2 is included in group A.

In operation 430, the first client 100-1 determines whether to set communication with the second client 100-2 based on whether communication with the host device 10 is set. For example, the first client 100-1 may automatically determine whether to set communication with other client devices included in group A, based on whether communication with the host device 10 belonging to group A is set.

In operation 440, the first client 100-1 that has set communication with the host device 10 may set communication with the second client 100-2. In response to determining communication with the host device 10 is set, the first client 100-1 may determine that communication with a plurality of devices included in group A is accepted, and may automatically transmit a communication acceptance message in response to a communication extension request received from the second client 100-2 without an additional determination process.

In operation 450, if the first client 100-1 that has not set communication with the host device 10, the first client does not set communication with the second client 100-2. For example, the first client 100-1 may automatically transmit a communication rejection message in response to a communication extension request of the second client 100-2, if the first client 100-1 has rejected or ignored a communication initiation request of the host device 10. Likewise, in operation 460, the first client 100-1 does not set communication with the second client 100-2 that is determined not to be included in group A.

Figure 5:
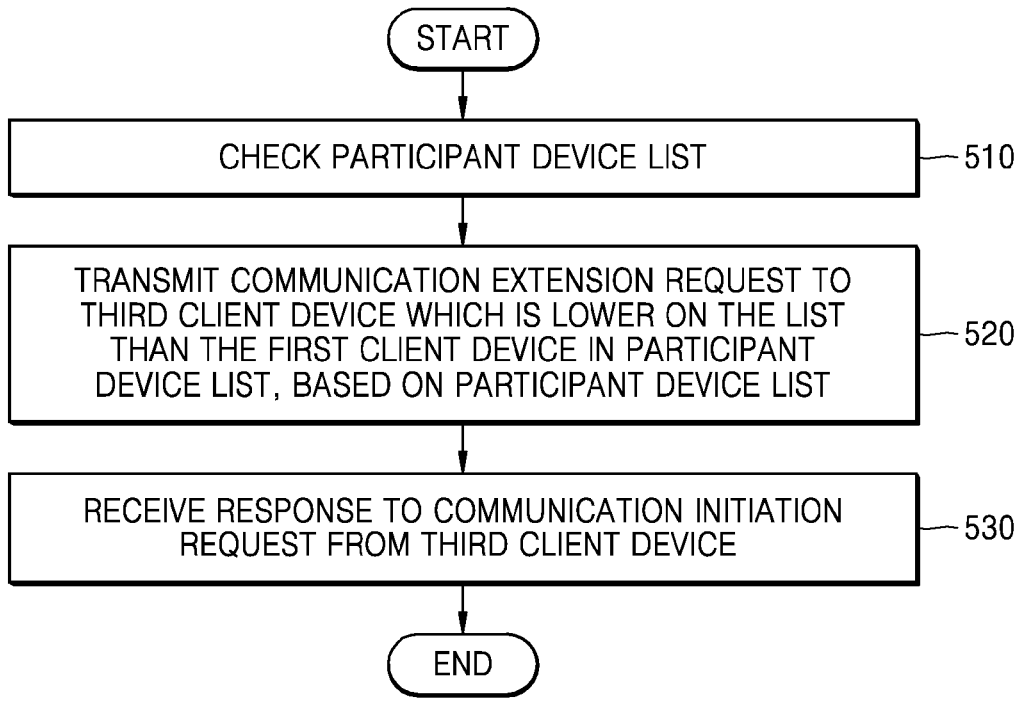
FIG. 5 is a flowchart illustrating a method of a first client device requesting a third client device, which is lower in order of priority, to set communication, according to an exemplary embodiment.

FIG. 5 is a flowchart illustrating a method of the first client 100-1 requesting the third client 100-3 that is lower in priority to set communication, according to an exemplary embodiment.

Referring to FIG. 5, in operation 510, the first client 100-1 checks a participant device list included in a communication initiation request received from the host device 10. For example, identification information of a plurality of devices included in group A may be included in a participant device list. The identification information of the host device 10 included in group A may include a user account of the host device 10 such as an email address alice@samsung.com. Also, a user account of the first client 100-1 such as cindy@samsung.com may be included as identification information of the first client 100-1, a user account of the second client 100-2 such as bob@samsung.com may be included as identification information of the second client 100-2, and a user account of the third client 100-3 such as dorothy@samsung.com may be included as identification information of the third client 100-3.

Referring again to FIG. 3, alice@samsung.com corresponding to the host device user is recorded first, bob@samsung.com corresponding to the second client is recorded second, cindy@samsung.com corresponding to the first client is recorded third, and dorothy@samsung.com corresponding to the third client is recorded fourth. In this example, identification information of the host device 10 that initiates communication of group A is recorded first.

In operation 520, the first client 100-1 transmits a communication extension request to the third client 100-3 that is lower in order with respect to the first client 100-1 in the participant device list. The first client 100-1 may check that dorothy@samsung.com is recorded after cindy@samsung.com, which is the user account of the first client 100-1, and may transmit a communication extension request to the third client 100-3 corresponding to the user account of dorothy@samsung.com.

In operation 530, the first client 100-1 receives a response to a communication extension request, from the third client 100-3. The third client 100-3 may determine whether to set communication with the first client 100-1 based on whether communication with the host device 10 is set.

For example, if the third client 100-3 has set communication with the host device 10 and the first client 100-1 is also included in group A, the third client 100-3 may set communication with the first client 100-1. That is, if the third client 100-3 has accepted a communication initiation request transmitted by using the host device 10, setting communication with a plurality of devices included in group A is accepted, and a communication acceptance message may be automatically transmitted in response to a communication extension request of the first client 100-1 without an additional determination process. Therefore, when the first client 100-1 receives a communication acceptance message from the third client 100-3, communication between the first client 100-1 and the third client 100-3 is set.

In contrast, when rejecting or ignoring a communication initiation request of the host device 10, the third client 100-3 may automatically transmit a communication rejection message in response to the communication extension request of the first client 100-1. In this example, communication between the first client 100-1 and the third client 100-3 is not set.

Figure 6:
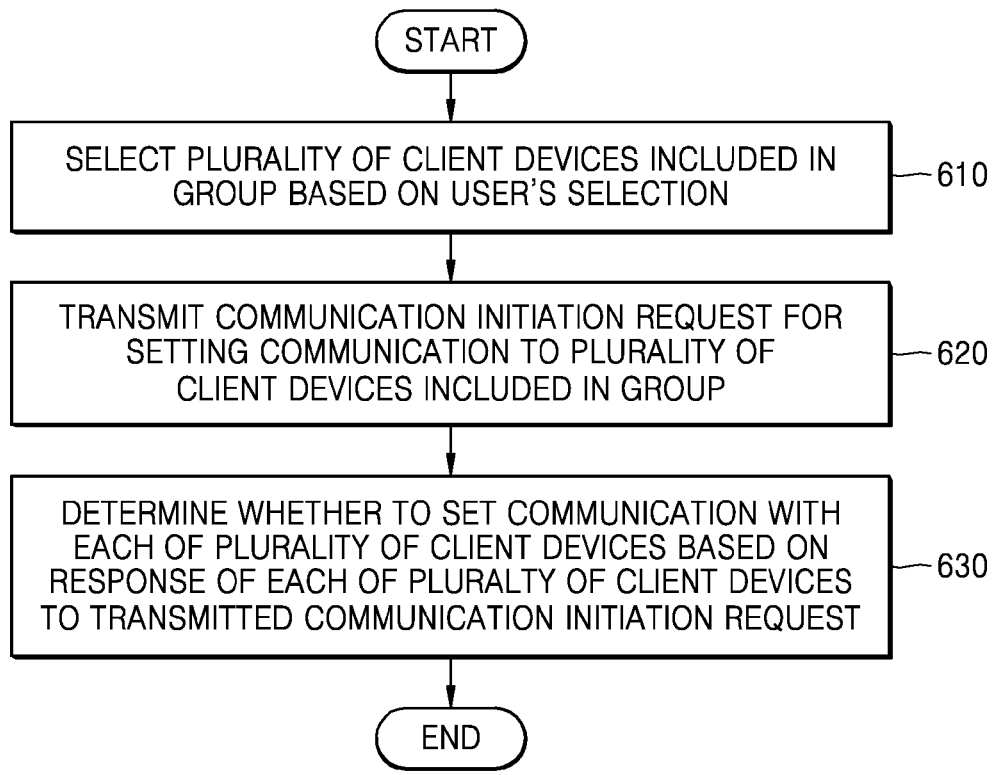
FIG. 6 is a flowchart illustrating a method of a host device communicating with a plurality of devices included in a group to which the host device belongs, according to an exemplary embodiment.

FIG. 6 is a flowchart illustrating a method of a host device communicating with a plurality of devices included in a group, according to an exemplary embodiment.

Referring to FIG. 6, in operation 610, the host device 10 selects a plurality of client devices (such as the first client 100-1, the second client 100-2, and the third client 100-3) included in group A based on a user's selection. For example, a user may select a plurality of devices from among the first client 100-1, the second client 100-2, and the third client 100-3, which are to perform group communication via a user interface provided on the host device 10.

For example, the host device 10 may provide a user interface via which group communication may be selected. For example, if a user selects a group communication button displayed on a screen of the host device 10, an input window may be displayed. Information about a plurality of client devices for which group communication is to be set may be displayed on the screen of the host device 10.

For example, a user may select a plurality of client devices using information stored in an address book or by inputting information of client devices with which communication is to be set. If a user selects Judy, a name of a friend, a client device that Judy is using may be included in group A. As another example, if a client device is a mobile phone, a user may input a telephone number to select the client device.

The host device 10 may generate a participant device list including identification information about the selected plurality of client devices and identification information of group A. If a device is a mobile device such as a smartphone, the identification information of the plurality of client devices may include one of a serial number, a USIM chip number, a device user account, and the like. As another example, identification information of group A may be generated by combining a number that a host device has randomly generated and a mark indicating group communication. For example, group 1110 may be generated as identification information of group A.

In operation 620, the host device 110 transmits a communication initiation request for setting communication, to the plurality of client devices included in group A. For example, the communication initiation request may include a participant device list including identification information of a plurality of devices included in group A, identification information of group A, call type information, communication type information, and the like. However, the information included in a communication initiation request is not limited thereto.

In operation 630, the host device 10 determines whether to set communication with each of the client devices based on a response of the plurality of client devices to the transmitted communication initiation request.

For example, when the first client 100-1 is already participating in a different communication network when it receives a communication initiation request from the host device 10, the first client 100-1 may not set communication with the host device 10. As another example, the first client 100-1 may determine whether to set communication with the host device 10 based on a user's selection. In this example, the first client 100-1 may display information about a communication initiation request received from the host device 10 on a screen of the first client 100-1.

When the first client 100-1 accepts the setting of communication with the host device 10, the first client 100-1 may transmit a communication acceptance message to the host device 10 indicating acceptance. When the host device 10 receives the communication acceptance message from the first client 100-1, communication between the host device 10 and the first client 100-1 is established.

On the other hand, if the first client 100-1 rejects the setting of communication with the host device 10, the first client 100-1 may transmit a communication rejection message to the host device 10 indicating rejection. When the host device 10 receives the communication rejection message from the first client 100-1, communication between the host device 100 and the first client 100-1 is declined.

Figure 7:
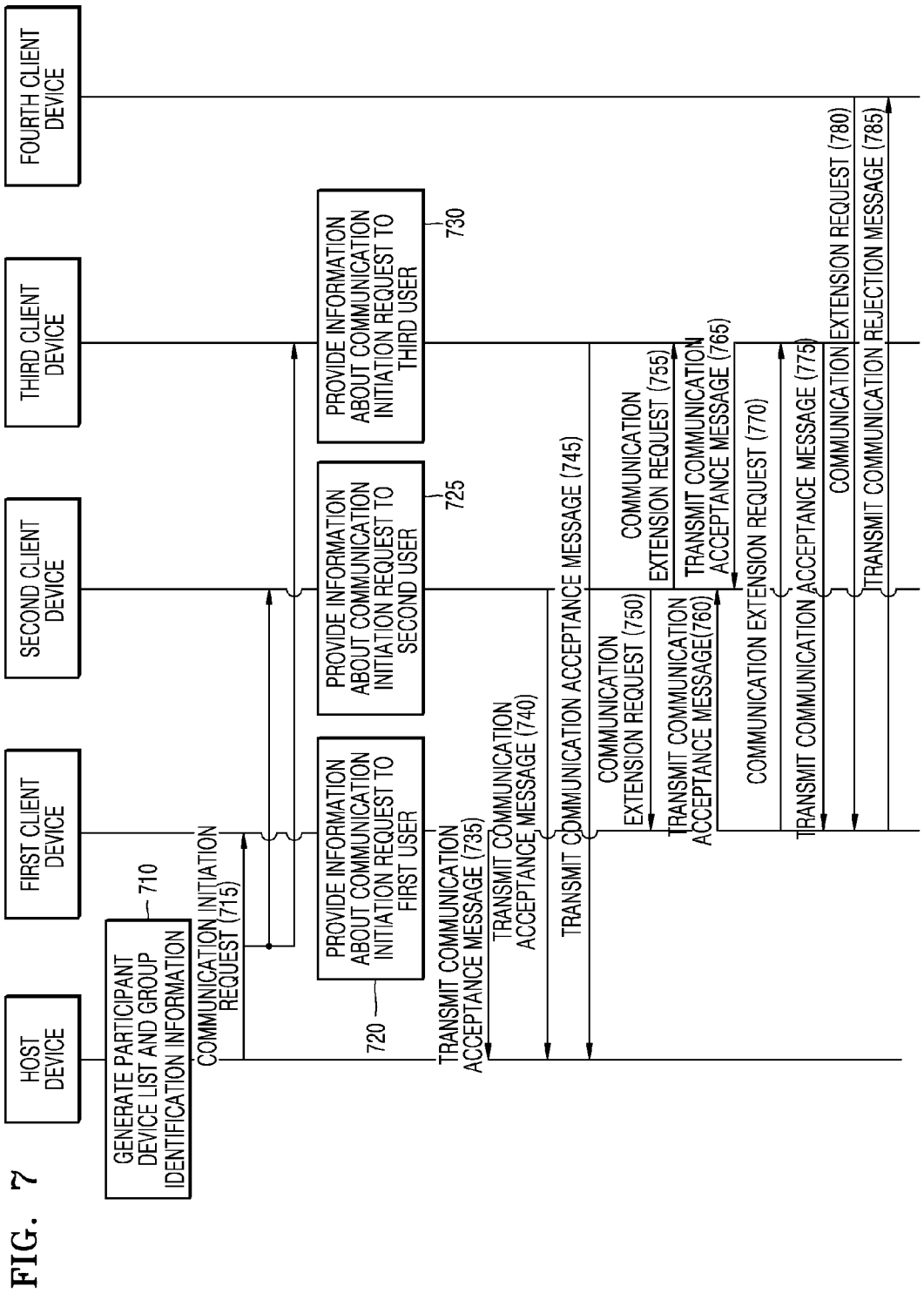
FIG. 7 is a flowchart illustrating a method of setting communication between a plurality of devices including a host device and a client device, according to an exemplary embodiment.

FIG. 7 is a flowchart illustrating a method of setting communication between a plurality of devices including a host device and a client device, according to an exemplary embodiment.

Referring to FIG. 7, included is the host device 10, the first client 100-1, the second client 100-2, and the third client 100-3 included in group A. In this example, a fourth client device 100-4 (hereinafter referred to as a fourth client 100-4) is a device that may not be included in group A.

In operation 710, the host device 10 generates a participant device list that includes identification information of a plurality of devices that are included in group A and identification information of group A. Identification information of each device included in the participant device list may be displayed in an order of the host device 10, the second client 100-2, the first client 100-1, and the third client 100-3.

In operation 715, the host device 10 transmits a communication initiation request to the first client 100-1, the second client 100-2, and the third client 100-3 included in group A. Here, the participant device list and identification information of group A may be included in the communication initiation request. Although the transmissions are shown separately in operation 715, it should be appreciated that the communication initiation requests may be simultaneously transmitted.

In operation 720, the first client 100-1 provides a user of the first client 100-1 with information about a communication initiation request received from the host device 10. For example, a list of a plurality of devices that are included in group A and a message inquiring whether to participate in group communication with group A may be displayed on a screen of the first client 100-1.

In operation 725, the second client 100-2 provides a user of the second client 100-2 with the information about a communication initiation request received from the host device 10. For example, the second client 100-2 may provide the user of the second client 100-2 with an alert that a communication initiation request is received via an alarm that has a melody that is different from an alarm when one-to-one communication is received.

In operation 730, the third client 100-3 provides a user of the third client 100-3 with the information about a communication initiation request received from the host device 10. For example, a list of a plurality of devices included in group A and a message inquiring whether to participate in group communication may be displayed on a screen of the third client 100-3.

In operation 735, the first client 100-1 transmits a communication acceptance message accepting the setting of communication in response to the communication initiation request, to the host device 10. In operation 740, the second client 100-2 transmits a communication acceptance message accepting the setting of communication in response to the communication initiation request, to the host device 10. In operation 745, the third client 100-3 transmits a communication acceptance message accepting the setting of communication in response to the communication initiation request, to the host device 10.

In operation 750, the second client 100-2 transmits a communication extension request to the first client 100-1 based on the participant device list included in the communication initiation request. In this example, the first client 100-1 is lower on the list than the second client 100-2 in the participant device list.

In operation 755, the second client 100-2 also transmits a communication extension request to the third client 100-3 based on the participant device list included in the communication initiation request. In this example, the third client 100-3 is also lower on the list than the second client 100-2 in the participant device list. As an example, because the second client 100-2 is farther up on the participation device list, the second client 100-2 may transmit communication initiation requests to the devices that are lower on the participation device list. However, this is merely for purposes of example, and devices on the list may transmit communication initiation requests to devices that are higher on the list or lower on the list.

Although the transmissions are shown separately in operations 750 and 755, it should also be appreciated that the communication extension requests in 750 and 755 may be simultaneously transmitted.

In operation 760, the first client 100-1 determines that the second client 100-2 is included in group A and that communication between the host device 10 and the first client 100-1 is set. In response, the first client 100-1 transmits a communication acceptance message to the second client 100-2. For example, the first client 100-1 may determine whether to set communication with the second client 100-2 without an additional determination process based on whether communication with the host device 10 is set.

If it is determined that the second client 100-2 is included in group A, the first client 100-1 may not provide a user of the first client 100-1 with information about the received communication extension request. For example, if the first client 100-1 provides information about a communication extension request to a user each time the first client 100-1 receives a communication extension request, it may be inconvenient for the user. Furthermore, if an alarm occurs each time the communication extension request is received from other client devices, it may be inconvenient to the user. Accordingly, the client device may respond to a communication extension request automatically based on whether communication between the first client 100-1 and the host device 10 is set or not.

In operation 765, the third client 100-3 determines that the second client 100-2 is included in group A and communication between the host device 10 and the third client 100-3 is set. In response, the third client 100-3 transmits a communication acceptance message to the second client 100-2.

In operation 770, the first client 100-1 transmits a communication extension request to the third client 100-3 based on the participant device list included in the communication initiation request. In this example, the third client 100-3 is lower on the list with respect to the first client 100-1 in the participant device list. As an example, based on the order of the list, the first client 100-1 may transmit the communication request.

In operation 775, the third client 100-3 determines that the first client 100-1 is included in group A and that communication between the host device 10 and the third client 100-3 is set. In response, the third client 100-3 transmits a communication acceptance message to the first client 100-1.

In operation 780, the first client 100-1 receives a communication extension request from the fourth client 100-4. However, the fourth client 100-4 is not included in group A. Accordingly, in operation 785 the first client 100-1 transmits a communication rejection message to the fourth client 100-4 indicating that the first client does not accept setting communication with the fourth client 100-4.

Figure 8:
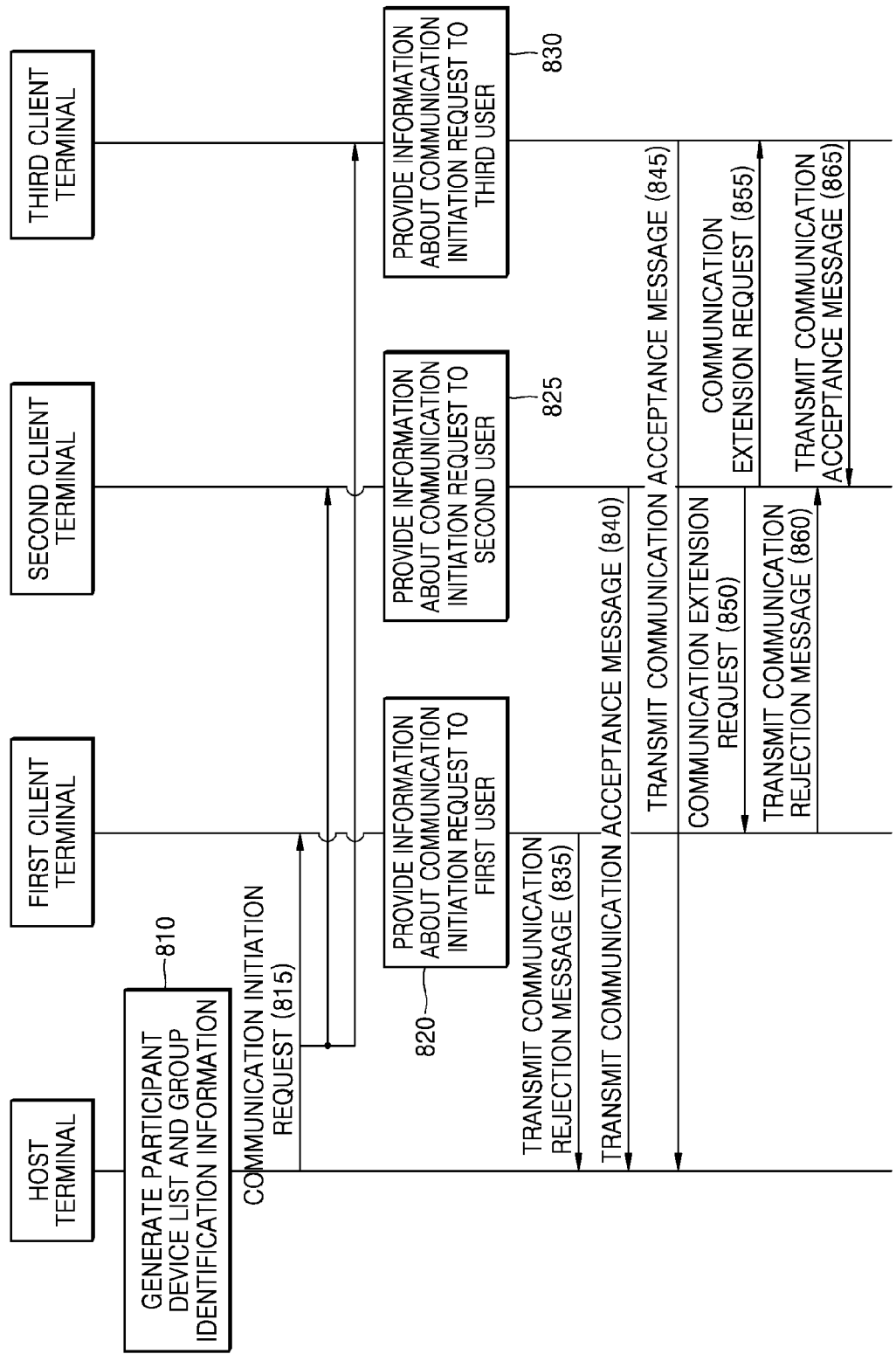
FIG. 8 is a flowchart illustrating a method of setting communication between a plurality of devices including a host device and a client device, according to another exemplary embodiment.

FIG. 8 is a flowchart illustrating a method of setting communication between a plurality of devices including a host device and a client device, according to another exemplary embodiment.

Referring to FIG. 8, the host device 10, the first client 100-1, the second client 100-2, and the third client 100-3 are a plurality of devices that are included in group A. In operation 810, the host device 10 generates a participant device list including identification information of a plurality of devices included in group A and identification information of group A.

In operation 815, the host device 10 transmits a communication initiation request to the first client 100-1, the second client 100-2, and the third client 100-3 included in group A. For example, the participant device list including the identification information of the devices included in group A may be included in the communication initiation request.

In operation 820, the first client 100-1 provides information about the communication initiation request received from the host device 10 to a user of the first client 100-1. For example, the first client 100-1 may display a list of devices included in group A and a message inquiring as to whether to participate in group communication, on a screen thereof.

In operation 825, the second client 100-2 provides a user of the second client 100-2 with information about the communication initiation request received from the host device 10. For example, the second client 100-2 may provide the user with an identification that a communication initiation request is received via an alarm of a melody that is different from an alarm when a one-to-one communication is received.

In operation 830, the third client 100-3 provides a user of the third client 100-3 with the information about the communication initiation request received from the host device 10. For example, the third client 100-3 may provide the user with an indication that the communication initiation request is received via an alarm of a melody that is different from an alarm when one-to-one communication is received.

In operation 835, the first client 100-1 transmits a communication rejection message rejecting the setting of communication to the host device 10. That is, the first client 100-1 determines not the establish the group communication with the host device 10.

In operation 840, the second client 100-2 transmits a communication acceptance message accepting the setting of communication to the host device 10. In operation 845, the third client 100-3 transmits a communication acceptance message accepting the setting of communication to the host device 10.

In operation 850, the second client 100-2 transmits a communication extension request to the first client 100-1 based on the participant device list included in the communication initiation request. In this example, the first client 100-1 is lower on the list than the second client 100-2 in the participant device list.

In operation 855, the second client 100-2 transmits a communication extension request to the third client 100-3 based on the participant device list included in the communication initiation request. In this example, the third client 100-3 is also lower on the list than the second client 100-2 in the participant device list.

In this example, in operation 860, the first client 100-1 determines that the second client 100-2 is included in group A but that communication between the host device 10 and the first client 100-1 is not set, and transmits a communication rejection message to the second client 100-2. That is, the first client 100-1 may determine whether to set communication with the second client 100-2 without an additional determination process based on whether communication with the host device 10 is set.

For example, without providing any additional information to the user of the first client 100-1, the first client 100-1 may transmit a communication rejection message in response to the communication extension request based on determining that communication between the first client 100-1 and the host device 10 is not set.

In operation 865, the third client 100-3 determines that the second client 100-2 is included in group A and that communication between the host device 10 and the third client 100-3 is also set. In response, the third client 100-3 transmits a communication acceptance message to the second client 100-2.

In this example, because the first client 100-1 did not set communication with the host device 10, the first client 100-1 does not transmit a communication extension request to the third client 100-3, which is lower on the participant device list than the first client 100-1.

Figure 9:
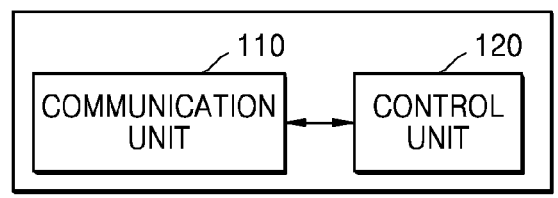
FIGS. 9 and 10 are block diagrams illustrating a first client device according to an exemplary embodiment.
Figure 10:
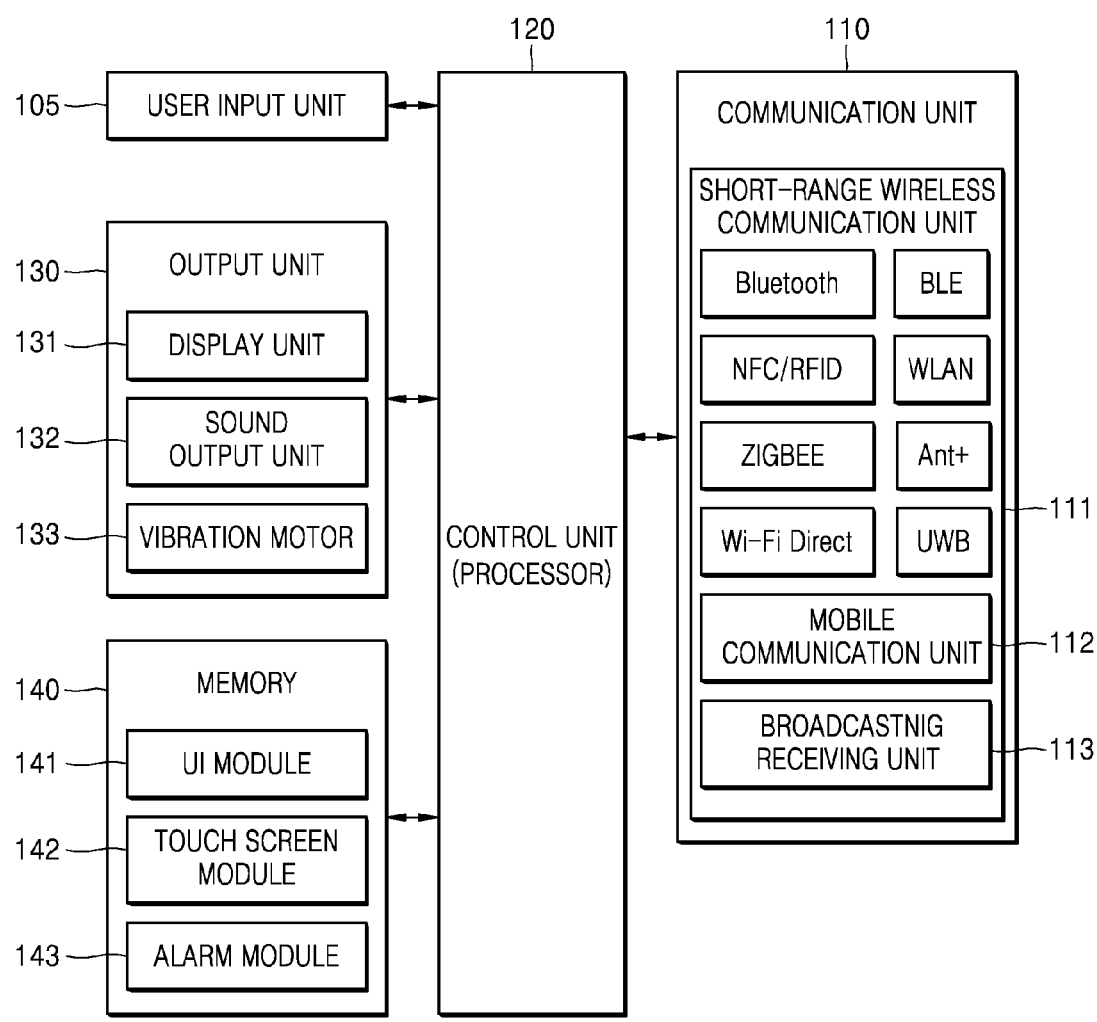

FIGS. 9 and 10 are block diagrams illustrating the first client 100-1 according to exemplary embodiments.

Referring to FIG. 9, the first client 100-1 may include a transceiver 110 and a control unit 120. However, the first client 100-1 may be implemented by more, less, or different components than the illustrated components. As a non-limiting example, the first client 100-1 may further include a user input unit 105, an output unit 130, and a memory 140, in addition to the transceiver 110 and the control unit 120.

The user input unit 105 may be used to input data to the first client 100-1. For example, a user may input a signal in response to a communication initiation request from the host device 10. Examples of the user input unit 105 include a keypad, a dome switch, a touch pad a jog wheel, a jog switch, a speech recognition module, a camera, and a microphone. Examples of the touch pad include a contact type electro capacitive touch pad, a pressure type resistive layer touch pad, an infrared sensing type touch pad, a surface ultrasonic wave conducting type touch pad, an integration type tension measuring touch pad, and a piezoelectric type touch pad.

The transceiver 110 may include at least one component for communicating between the first client 100-1 and the host device 10 and between the first client 100-1 and other client devices such as the second client device 100-2 and the third client device 100-3. For example, the transceiver 110 may include a short range wireless transceiver 111, a mobile transceiver 112, a broadcasting receiving unit 113, and the like. For example, the transceiver 110 may perform the role of a transceiver by transmitting and receiving data.

Examples of the short-range wireless communication unit 111 include a Bluetooth communication unit, a Bluetooth Low Energy (BLE) communication unit, a Near Field Communication (NFC) unit, a Wireless Local Area Network (WLAN) communication unit, a Zigbee communication unit, an infrared Data Association (IrDa) communication unit, a Wi-Fi Direct (WFD) communication unit, a ultra wideband (UWB) communication unit, an ANT+ communication unit, and the like.

The mobile communication unit 112 transmits and receives a wireless signal to and from at least one of a base station on a mobile communication network, an external terminal, a server, and the like. Examples of a wireless signal include a voice call signal, a video call signal, and various types of data according to transmission and reception of text or multimedia messages.

The broadcasting receiving unit 113 receives a broadcasting signal and information related to broadcasting, from an outside source through a broadcasting channel. A broadcasting channel may include a satellite channel or a terrestrial channel. As another example, the first client 100-1 may not include a broadcasting receiving unit 113.

The transceiver 110 may receive a communication initiation request from the host device 10 for setting communication between the host device 10 and the first client 100-1. In this example, the host device 10 is included in a group that also includes the first client 100-1. The communication initiation request may include a participant device list including identification information of devices that are included in the group and identification information of the group.

The transceiver 110 may transmit a communication extension request for setting communication between the first client 100-1 and the third client device 100-3, to the third client device 100-3. For example, the third client device 100-3 may be included on the participant device list at a lower position than the first client 100-1 in the participant device list. Also, the transceiver 110 may receive a response to the communication extension request, from the third client device 100-3.

The control unit 120 may control an overall operation of the first client 100-1. For example, the control unit 120 may extract a participant device list from data that is stored in the memory 140. The control unit 120 may extract a participant device list from the received communication initiation request and store the same in the memory 140. Also, the control unit 120 may control the user input unit 105 and the transceiver 110.

The control unit 120 may determine whether to set communication with the host device 10 based on a communication state of the first client 100-1. Also, the control unit 120 may control the transceiver 110 such that the transceiver 110 receives a communication extension request from the second client 100-2 for setting communication between the second client 100-2 and the first client 100-1.

The control unit 120 may determine whether the second client 100-2 is included in a group to which the first client 100-1 belongs. If it is determined that the second client 100-2 is included in the same group as the first client 100-1, the control unit 120 may determine whether to set communication with the second client 100-2 based on whether communication between the host device 10 and the first client 100-1 is also set.

For example, the control unit 120 may obtain a participant device list included in a communication initiation request. The control unit 120 may determine whether identification information of the second client 100-2 is included in the participant device list. In response to the identification information of the second client 100-2 being included in the participant device list, the control unit 120 may determine that the second client 100-2 is included in the group to which the first client 100-1 belongs.

If the first client 100-1 sets communication with the host device 10, the control unit 120 may set communication with the second client 100-2 which is also included in the group to which the first client 100-1 belongs and which is set to communicate with the host device 10.

The control unit 120 may respond to the communication extension request of the second client 100-2 based on a determination as to whether to set communication with the second client 100-2. For example, if the control unit 120 has determined to set communication with the second client 100-2, the control unit 120 may transmit a communication acceptance message to the second client 100-2. As another example, if the control unit 120 has determined not to set communication with the second client 100-2, the control unit 120 may transmit a communication rejection message to the second client 100-2.

For example, the control unit 120 may provide a user with information about the communication initiation request received from the host device 10. Upon receiving a communication initiation request, the control unit 120 may control the output unit 130 to provide information to a user of the client device indicating that the communication initiation request is received, for example, via a sound, vibration, an image, and the like.

In response to receiving a communication extension request from the second client 100-2, the control unit 120 may determine whether to set communication with the second client 100-2 without providing information about the communication extension request to the user of the first client 100-1.

The control unit 120 may include one or more processing devices. A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors The output unit 130 may be used to output an audio signal, a video signal, a vibration signal, and the like. The output unit 130 may include, for example, a display unit 131, a sound output unit 132, and a vibration motor 133.

The display unit 131 displays and outputs processed information. For example, the display unit 131 may display information about the communication initiation request received by the first client 100-1. When a communication initiation request is received from the host device 10, the display unit 131 may display a list of devices participating in group communication. Also, the display unit 131 may display a pop up message, push notification, and the like, to provide information indicating to a user that a communication initiation request for setting communication is received from the host device 10.

A touch screen may have a layered structure including the display unit 131 and a touch pad. Therefore, the display unit 131 may also be used as an input unit in addition to as an output unit. The display unit 131 may include at least one of a liquid crystal display, a thin film transistor-liquid crystal display, an organic light-emitting diode display, a flexible display, a 3D display, an electrophoretic display, a wearable display, and the like. Also, the first client 100-1 may include two or more display units 131 according to an implementation form of the first client 100-1. The two or more display units 131 may be coupled to face each other using a hinge or other connector.

The sound output unit 132 outputs audio data that is received from the transceiver 110 or stored in the memory 140. Also, the sound output unit 132 outputs a sound signal related to functions performed by the first client 100-1, for example, a call signal receiving sound, a message receiving sound, an alarming sound, and the like. The sound output unit 132 may include a speaker or a buzzer.

The vibration motor 133 may output a vibration signal. For example, the vibration motor 133 may output a vibration signal corresponding to an output of audio data or video data such as a call signal receiving sound or a message receiving sound. Also, the vibration motor 133 may output a vibration signal if a touch is input to the touch screen.

The memory 140 may store a program for processing or controlling the control unit 120 and may store input or output data, for example, a plurality of menus, a plurality of first level submenus respectively corresponding to the plurality of menus, a plurality of second level submenus respectively corresponding to the plurality of first level submenus, and the like.

The memory 140 may include at least one type of storage medium from among a flash memory type memory, a hard disk type memory, a multimedia card micro type memory, a card type memory (e.g., an SD (Secure Digital) or XD (eXtreme Digital) memory, etc.), Random Access Memory (RAM) a Static Random Access Memory (SRAM), Read-Only Memory (ROM), Electrically Erasable Programmable Read-Only Memory (EEPROM), Programmable Read-Only Memory (PROM), a magnetic memory, a magnetic disk, an optical disk, and the like. Also, the first client 100-1 may operate or connect to a web storage or a cloud server that performs the function of storage of the memory 140 through the Internet.

Programs stored in the memory 140 may be classified into multiple modules according to functions. For example, the programs may be classified into a UI module 141, a touch screen module 142, an module 143, and the like.

The UI module 141 may provide specialized UIs or GUIs that are connected with the first client 100-1 according to various applications that provide a communication service. The touch screen module 142 may sense a touch gesture by a user on a touch screen and may transmit information about the touch gesture to the control unit 120. The touch screen module 142 may recognize a touch code and analyze the same. The touch screen module 142 may be included as separate hardware including a controller.

Various sensors may be included inside or near the touch screen in order to sense a touch or a proximity touch with respect to the touch screen. An example of a sensor that senses a touch of a touch sensor is a tactile sensor. A tactile sensor senses a contact of a particular object at a degree that a human feels or at an even greater degree. The tactile sensor may sense various information such as the roughness of a contacting surface, the rigidity of a contacting object, a temperature at a contacting point, and an amount of pressure applied during the contact. An example of a sensor for sensing a touch of a touch screen is a proximity sensor which may use electromagnetic radiation such as infrared rays to detect the presence of an object.

The proximity sensor senses whether there is an object approaching a predetermined detection surface or an object that is present near a predetermined detection surface, using an electromagnetic force or an infrared ray, without any mechanical contact. Examples of the proximity sensor include a transmissive photoelectric sensor, a direct reflective photoelectric sensor, a mirror reflection type photoelectric sensor, a high frequency oscillation proximity sensor, an electrostatic proximity sensor, a magnetic proximity sensor, an infrared proximity sensor, and the like. Examples of a touch gesture of a user include a tap, a touch & hold, a double tap, a drag, a panning, a flick, a drag and drop, a swipe, and the like.

Figure 11:
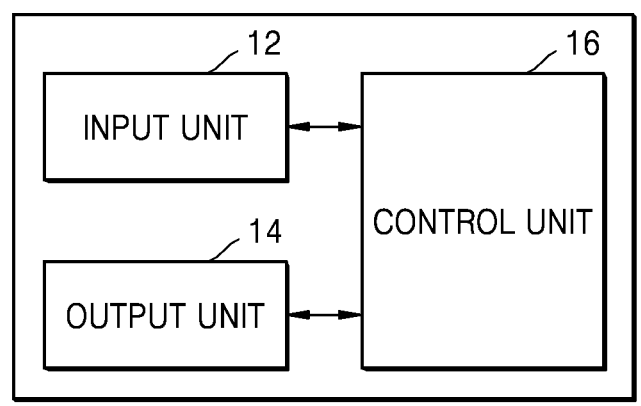
FIG. 11 is a block diagram illustrating a host device according to an exemplary embodiment.

FIG. 11 is a block diagram illustrating a host device 10 according to an exemplary embodiment.

Referring to FIG. 11, the host device 10 may include an input unit 12, an output unit 14, and a control unit 16. However, the host device 10 may be implemented using more components, less components, or different components than the illustrated ones. It should also be appreciated that the host device 10 may be the same type of device as the first client 100-1 illustrated in FIG. 10, and the like.

The input unit 12 may select a plurality of client devices (a first client 100-1, a second client 100-2, and a third client 100-3) included in a group to which the host device 10 belongs, according to a user's selection. For example, the user may select a plurality of client devices that are to perform group communication, via a user interface provided using the input unit 12.

The output unit 14 may transmit a communication initiation request to each of the selected plurality of client devices (the first client 100-1, the second client 100-2, and the third client 100-3). For example, the output unit 14 may transmit the communication initiation requests separately or simultaneously. The communication initiation request may include a participant device list generated using the control unit 16. The communication initiation request may include identification information of the plurality of client devices included in the group, to which the host device 10 belongs, and identification information of the group.

The first client 100-1 may receive a communication extension request for setting communication, from the second client 100-2 based on the participant device list. Also, the first client 100-1 may transmit a communication extension request for setting communication to the third client 100-3 based on the participant device list.

The control unit 16 may determine whether to set communication with the plurality of client devices based on a response of each of the plurality of client devices.

The device described herein may comprise a processor, a memory for storing program data and executing it, a permanent storage device such as a disk drive, a communications port for handling communications with external devices, and user interface devices, including a display, a keyboard, and the like. When software modules are involved, these software modules may be stored as program instructions or computer-readable codes executable on the processor on a computer-readable media such as magnetic storage media (e.g., read-only memory (ROM), random-access memory (RAM), floppy disks, hard disks, etc.) and optical recording media (e.g., CD-ROMs, DVDs, etc.). The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the present description, reference has been made to the exemplary embodiments illustrated in the drawings, and specific language has been used to describe these embodiments. However, no limitation of the scope of the description is intended by this specific language, and the description should be construed to encompass all embodiments that would normally occur to one of ordinary skill in the art.

The present description may be described in terms of functional block components and various processing steps. Such functional blocks may be implemented by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements they may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism" and "element" are used broadly and are not limited to mechanical or physical embodiments, but can include software routines in conjunction with processors.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

While one or more embodiments have been described with reference to the figures, it will be understood by those of ordinary skill in the art that various changes in form and details may be made therein without departing from the spirit and scope as defined by the following claims.

What is claimed is:

1. A method of a first client device for setting communication with devices included in a group, the method comprising:
   receiving, from a host device included in the group, a communication initiation request for setting a communication between the host device and the first client device, wherein the communication initiation request comprises a participant device list that comprises identification information of devices included in the group and identification information of the group;
   determining whether to set the communication with the host device based on a communication state of the first client device;
   receiving, from a second client device ordered before the first client device in the participant device list for the group, a communication extension request for setting a communication between the second client device and the first client device, wherein the communication extension request is based on an order in which the devices included in the group are listed in the participant device list;
   determining whether the second client device is included in the group; and
   in response to determining that the second client device is included in the group, determining whether to set the communication with the second client device based on whether communication between the host device and the first client device is set.

2. The method of claim 1, further comprising transmitting, to a third client device, another communication extension request for setting communication between the first client device and the third client device, based on the order in which the devices are listed in the participant device list.

3. The method of claim 2, further comprising receiving a response to the transmitted communication extension request from the third client device.

4. The method of claim 1, wherein the determining whether the second client device is included in the group further comprises:
   obtaining a participant device list included in the communication initiation request; and
   determining whether identification information of the second client device is included in the participant device list, wherein if the identification information of the second client device is included in the participant device list, the first client device determines that the second client device is included in the group.

5. The method of claim 1, wherein, in response to determining that the second device is included in the group and determining that the first client device is set to communicate with the host device, the first client device determines to set communication with the second client.

6. The method of claim 1, further comprising transmitting a response to the second client device indicating a determination as to whether to set communication with the second client device.

7. The method of claim 1, further comprising outputting information about the received communication initiation request to a user of the first client device.

8. The method of claim 1, further comprising determining whether to set communication with the second client device without outputting information about the received communication extension request to a user of the first client device.

9. A non-transitory computer-readable medium having recorded thereon a computer program that is executable by a computer to perform the method of claim 1.

10. A method of a host device for setting communication with other devices included in a group, the method comprising:
selecting a plurality of client devices included in the group according to a selection by a user;
transmitting a communication initiation request for setting communication to the plurality of client devices included in the group, wherein the communication initiation request comprises a participant device list that comprises identification information of a plurality of client devices included in the group and identification information of the group; and
determining whether to set communication with the plurality of client devices including a first client device and a second client device based on a responses of the plurality of client devices to the transmitted communication initiation request,
wherein a communication extension request for setting a communication between the second client device and the first client device is transmitted from the second client device to the first client device, wherein the second client device is ordered before the first client device in the participant device list for the group, and wherein the communication extension request is based on an order in which the devices included in the group are listed in the participant device list.

11. A first client device that sets communication with devices included in a group, the first client device comprising:
a transceiver configured to receive, from a host device included in the group, a communication initiation request for setting communication between the host device and the first client device, wherein the communication initiation request comprises a participant device list that comprises identification information of devices included in the group and identification information of the group; and
a processor configured to determine whether to set communication with the host device based on a communication state of the first client device, and determine whether to set communication with a second client device ordered before the first client device in a participant device list for the group based on whether the second client device is included in the group and communication between the host device and the first client device is set,
wherein the transceiver is further configured to transmit a communication extension request for setting the communication between the first client device and the second client device based on an order in which the devices in the group are listed in the participant device list.

12. The first client device of claim 11, wherein the transceiver is configured to transmit a communication extension request for setting communication between the first client device and a third client device based on the order of the devices listed on the participant device list.

13. The first client device of claim 12, wherein the transceiver is configured to receive a response to the transmitted communication extension request from the third client device.

14. The first client device of claim 11, wherein the processor is configured to obtain the participant device list included in the communication initiation request, determine whether identification information of the second client device is included in the participant device list, and, in response to determining that the identification information of the second client device is included in the participant device list, determine that the second client device is included in the group.

15. The first client device of claim 11, wherein, in response to the first client device setting communication with the host device, and in response to determining that the second client device is included in the group, the processor is configured to set communication with the second client device.

16. The first client device of claim 11, wherein the transceiver is configured to transmit a response to the second client device indicating a determination as to whether to set communication with the second client device.

17. The first client device of claim 11, wherein the processor is configured to output information about the received communication initiation request to a user of the first client device.

18. The first client device of claim 11, wherein the processor is configured to determine whether to set communication with the second client device without providing information about the received communication extension request to a user of the first client device.

19. A host device that sets communication with other devices included in a group, the host device comprising:
an input unit configured to receive a user selection of a plurality of client devices included in the group;
a transceiver configured to transmit a communication initiation request for setting communication, to the plurality of client devices included in the group, wherein the communication initiation request comprises a participant device list that comprises identification information of a plurality of client devices included in the group and identification information of the group; and
a processor configured to determine whether to set communication with the plurality of client devices based on responses of the plurality of client devices,
wherein the plurality of client devices include a first client device and a second client device, and
wherein a communication extension request for setting a communication between the second client device and the first client device is transmitted from the second client device to the first client device, wherein the second client device is ordered before the first client device in the participant device list for the group, and wherein the communication extension request is based on an order in which the devices included in the group are listed in the participant device list.

* * * * *